United States Patent

Iwabuchi et al.

[11] Patent Number: 5,564,981
[45] Date of Patent: Oct. 15, 1996

[54] ROTATION TRANSMISSION BUFFER APPARATUS

[75] Inventors: Norio Iwabuchi; Kazuyoshi Murakami, both of Ageo, Japan

[73] Assignee: Fukoku Co., Ltd., Saitama, Japan

[21] Appl. No.: 194,576

[22] Filed: Feb. 10, 1994

[51] Int. Cl.$^6$ ............................................. F16D 3/50
[52] U.S. Cl. .................................. 464/73; 464/92
[58] Field of Search ............................ 464/73, 89, 92, 464/93, 903

[56] References Cited

U.S. PATENT DOCUMENTS

| | | | |
|---|---|---|---|
| 3,552,145 | 1/1971 | Barton et al. | 464/73 |
| 3,636,729 | 1/1972 | Patel | 464/73 X |
| 3,662,568 | 5/1972 | Kashima et al. | 464/93 |
| 3,834,182 | 9/1974 | Trask et al. | 464/92 X |
| 3,884,049 | 5/1975 | Pauli | 464/73 |
| 4,228,664 | 10/1980 | McCoy | 464/92 |
| 4,327,562 | 5/1982 | Gottschalk | 464/89 X |
| 4,925,431 | 5/1990 | Pokrandt et al. | 464/903 X |
| 5,178,026 | 1/1993 | Matsumoto | 464/73 X |
| 5,214,975 | 6/1993 | Zalewski | 464/73 X |
| 5,267,482 | 12/1993 | Yoshida et al. | 464/73 X |

*Primary Examiner*—Daniel P. Stodola
*Assistant Examiner*—William A. Rivera
*Attorney, Agent, or Firm*—Townsend & Banta

[57] ABSTRACT

A rotation transmission buffer apparatus for transmitting the turning force of an input rotary body to an output rotary body through an elastic body provided therebetween. The input rotary body is provided with a plurality of engaging spaces, and the elastic body is provided with a plurality of engaging grooves and a plurality of projecting portions which are respectively fitted into the plurality of engaging spaces of the input rotary body. The output rotary body is provided with a plurality of protruding pieces which are respectively fitted into the plurality of engaging grooves of the elastic body.

2 Claims, 3 Drawing Sheets

ROTATION TRANSMISSION BUFFER APPARATUS

BACKGROUND OF THE INVENTION

1. Field of the Invention

The present invention relates to a rotation transmission buffer apparatus composed of an input rotary body, an output rotary body and an elastic body provided therebetween and, more particularly to a rotating transmission buffer apparatus which has a simpler structure and in which the durability of the elastic body is improved.

2. Description of the Related Art

A conventional rotation transmission buffer apparatus composed of an input rotary body, an output rotary body and an elastic body provided therebetween absorbs the inertia force of, for example, a motor when a window of an automobile is raised or lowered by the turning force of the motor, by deforming a cylindrical rubber member as the elastic body, thereby preventing the breakage of the gear provided on the output rotary body.

A rotation transmission buffer apparatus shown in FIGS. 4 and 5 has been proposed. In FIGS. 4 and 5, the reference numeral 1 represents an annular input rotary body. A multiplicity of teeth 1A are provided on the outer peripheral surface of the input rotary body 1 so as to mesh the gear (not shown) on the output shaft of a motor (not shown), and a plurality of substantially T-shaped notches 1B are formed on the inner peripheral surface of the input rotary body 1.

The reference numeral 2 represents an elastic body made of rubber, for example. The elastic body 2 is composed of a cylindrical portion 2A and a plurality of substantially T-shaped joint arms 2B which are integral with and project radially from the cylindrical portion 2A.

The reference numeral 3 represents a cylindrical output rotary body. An output shaft 4 is joined to the center of the output rotary body 3 by a bolt 5, and the inner peripheral surface of the cylindrical portion 2A of the elastic body 2 is bonded to the outer peripheral surface of the output rotary body 3 by, for example, vulcanizng adhesion.

The rotation transmission buffer apparatus having the above-described structure is assembled by fitting the plurality of substantially T-shaped joint arms 2B which are integral with and project radially from the cylindrical portion 2A of the elastic body 2 into the plurality of substantially T-shaped notches 1B formed on the inner peripheral surface of the input rotary body 1.

According to this structure, the turning force of the motor (not shown) is transmitted to the teeth 1A of the input rotary body 1 so as to rotate the input rotary body 1. The turning force of the input rotary body 1 rotates the elastic body 2 and the output rotary body 3 through the substantially T-shaped joint arms 2B of the elastic body 2 which are fitted into the plurality of substantially T-shaped notches 1B formed on the inner peripheral surface of the input rotary body 1.

The conventional rotation transmission buffer apparatus, however, is disadvantageous in that since the inner peripheral surface of the cylindrical portion 2A of the elastic body 2 is bonded to the outer peripheral surface of the output rotary body 3 by vulcanizng adhesion, a crack is formed in the cylindrical portion 2A due to a repeated fatigue and a change with time or the cylindrical portion 2A comes out due to a reduction in the adhesion strength, and in that since the shapes of the substantially T-shaped notches 1B of the input rotary body 1 and the substantially T-shaped joint arms 2B of the elastic body 2 are complicated, a large number of machining and assembling steps are necessary.

SUMMARY OF THE INVENTION

Accordingly, it is an object of the present invention to eliminate the above-described problems in the related art and to provide a rotation transmission buffer apparatus which can reduce the number of assembling steps by simplifying the structure and which can enhance the durability of the elastic body.

To achieve this aim, the present invention provides a rotation transmission buffer apparatus comprising: an input rotary body having a plurality of engaging spaces; an elastic body provided with a plurality of engaging grooves and a plurality of projecting portions which are respectively fitted into the plurality of engaging spaces of the input rotary body; and an output rotary body provided with a plurality of protruding pieces which are respectively fitted into the plurality of engaging grooves of the elastic body.

According to this structure of the rotation transmission buffer apparatus of the present invention, the assembly of the apparatus is facilitated, the number of assembling steps is reduced, and the life of the apparatus is prolonged.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
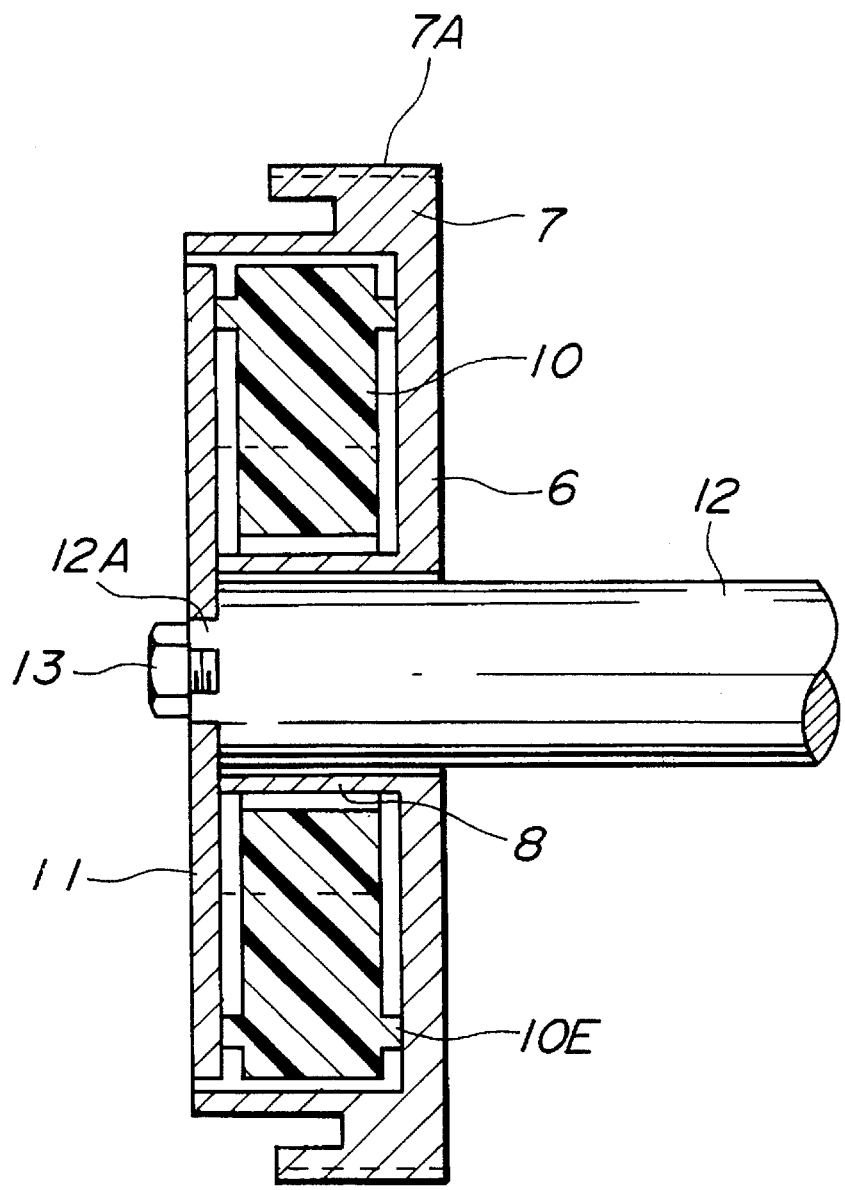
FIG. 1 is a vertical sectional view of an embodiment of a rotation transmission buffer apparatus according to the present invention.
Figure 2:
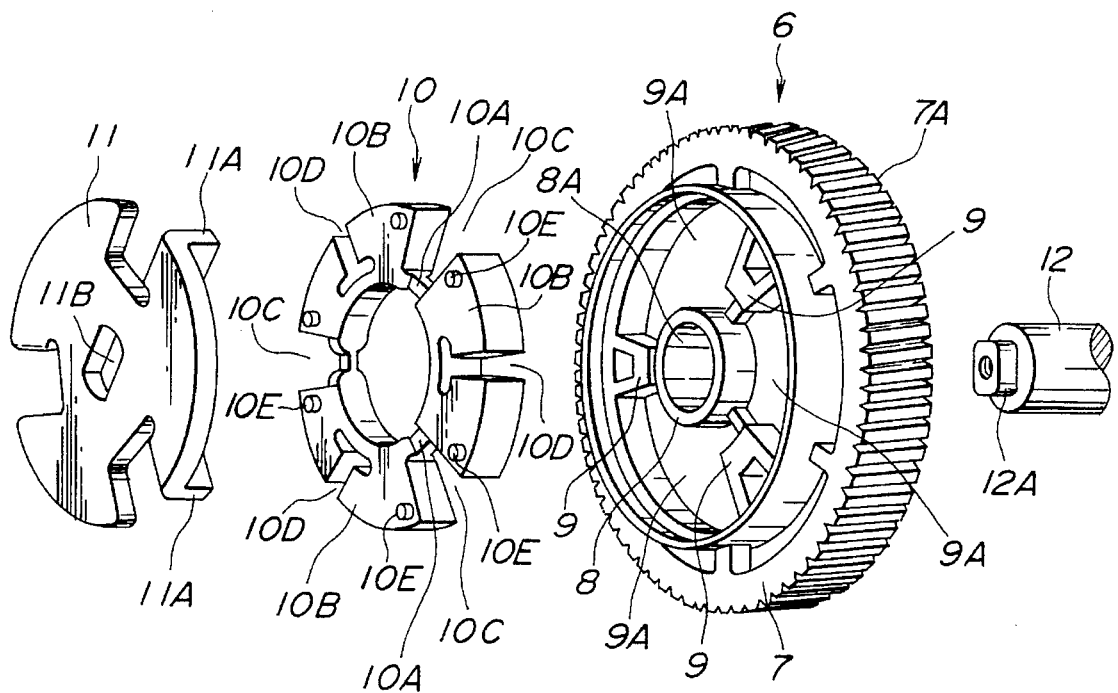
FIG. 2 is a detailed exploded perspective view of the embodiment shown in FIG. 1.

FIG. 1 is a vertical sectional view of an embodiment of a rotation transmission buffer apparatus according to the present invention and FIG. 2 is an exploded perspective view thereof. In FIGS. 1 and 2, the reference numeral 6 represents an annular input rotary body which is composed of an annular outer peripheral member 7, an annular inner peripheral member 8 provided on the inside of the outer peripheral member 7, and a plurality of (e.g., three) joint arms 9 for connecting the outer peripheral member 7 and the inner peripheral member 8. The input rotary body 6 is formed of, for example, a rigid resin.

The outer peripheral member 7 is provided with a multiplicity of teeth 7A on the outer peripheral surface which mesh a gear (not shown) integrally mounted on the output shaft of a motor (not shown) or the like. The center hole 8A of the inner peripheral member 8 receives a later-described output shaft. An engaging space 9A is formed between every two joint arms 9.

The reference numeral 10 denotes an elastic body which is composed of an annular portion 10A and a plurality of (three, in this embodiment) projecting portions 10B which radially project from the annular portion 10A. A space 10C for receiving the corresponding joint arm 9 is provided between every two projecting portions 10B. An engaging groove 10D having a shape of an inverted T is formed in each of the projecting portions 10B. A small projection 10E is provided at any position on both side surfaces of the projecting portions 10B of the elastic body 10 so as to facilitate an elastic deformation of the elastic body 10.

If the surface of the elastic body 10 is subjected to a wear resistance reinforcing treatment such as halogenation, chlorination and resin coating (e.g., nylon coating), it is possible to enhance the cracking resistance and the wear resistance.

Figure 3:
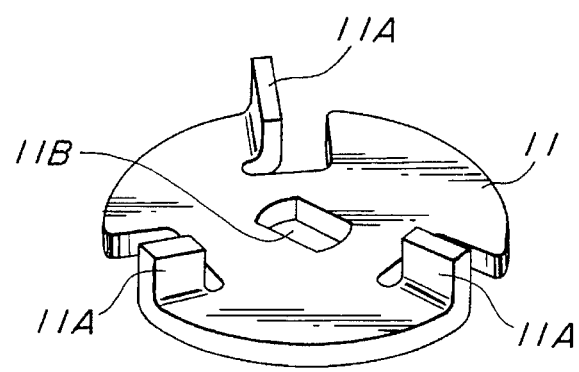
FIG. 3 is a perspective view of the output rotary body of the embodiment shown in FIG. 1.
Figure 4:
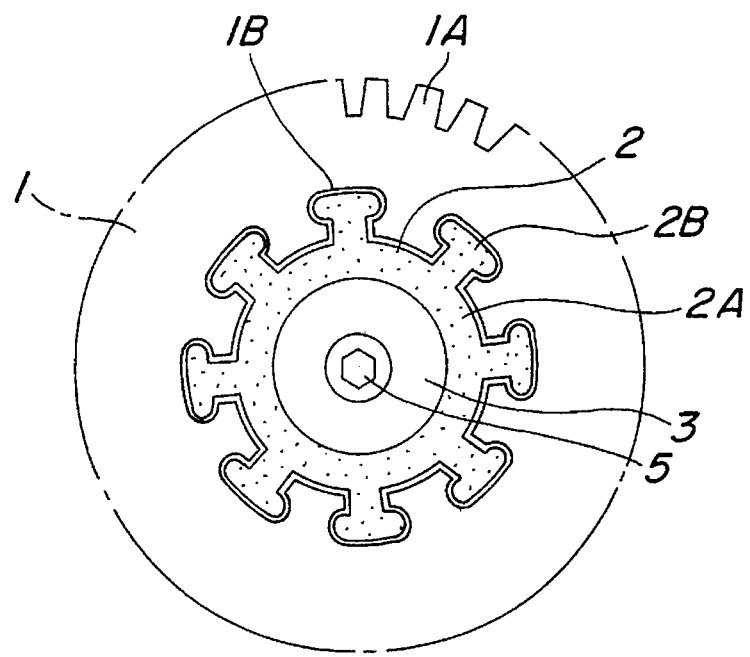
FIG. 4 is an elevational view of a conventional rotation transmission buffer apparatus.
Figure 5:
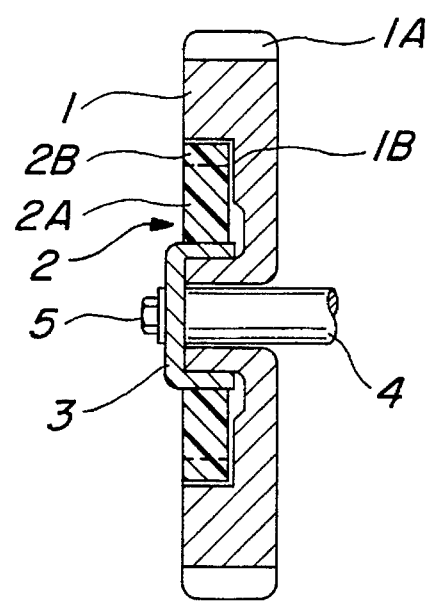
FIG. 5 is a sectional view of the conventional rotation transmission buffer apparatus shown in FIG. 4.

The reference numeral 11 represents an output rotary body. The output rotary body 11 is provided with a plurality of (three, in this embodiment) protruding pieces 11A, as shown in the detailed perspective view of the output rotary body 11 in FIG. 3. The output rotary body 11 having the three protruding pieces 11A is produced, for example, by forming three L-shaped cuts on a substantially circular metal plate and bending each of the cut portions up at right angles to the surface of the metal plate.

The reference numeral 12 denotes an output shaft. A substantially rectangular protrusion 12A is formed at one end of the output shaft 12. The protrusion 12A is engaged with a substantially rectangular hole 11B formed at the center of the output rotary body 11, and fixed therein by a bolt 13.

Owing to the engaging groove 10D having a shape of a substantially inverted T formed in each of the projecting portions 10B of the elastic body 10, it is possible to prevent the stress from concentrating on the supporting portion. The plurality of small projections 10E provided on both side surfaces of the elastic body 10 form a gap between the input rotary body 6 and the elastic body 10 and a gap between the elastic body 10 and the output rotary body 11, thereby facilitating an elastic deformation of the elastic body 10.

The assembly of the rotation transmission buffer apparatus having the above-described structure will now be explained. The three projecting portions 10B of the elastic body 10 are first inserted respectively into the three engaging spaces 9A of the input rotary body 6. The three protruding pieces 11A of the output rotary body 11 are then inserted respectively into the three engaging grooves 10D of the elastic body 10.

The output shaft 12 is inserted into the center hole 8A of the inner peripheral member 8 of the input rotary body 6 and then into the annular portion 10A of the elastic body 10. Thereafter, the substantially rectangular protrusion 12A is fitted into the substantially rectangular hole 11B of the output rotary body 11. By fixing the protrusion 12A in the hole 11B by the bolt 13, the assembly is completed.

In the rotation transmission buffer apparatus having the above-described structure, when the gear (not shown) which is integrally mounted on the rotary shaft of a motor (not shown) is rotated, the input rotary body 6 which meshes the gear (not shown) rotates. Since the three projecting portions 10B of the elastic body 10 are respectively fitted into the three engaging spaces 9A of the input rotary body 6 and the three protruding pieces 11A of the output rotary body 11 are respectively fitted into the three engaging grooves 10D of the elastic body 10, the rotation of the input rotary body 6 is transmitted to the output rotary body 11 through the elastic body 10.

Since the substantially rectangular protrusion 12A of the output shaft 12 is fitted into the substantially rectangular hole 11B of the output rotary body 11, the rotation of the output rotary body 11 is transmitted so as to rotate the output shaft 12. Since the elastic body 10 is provided between the input rotary body 6 and the output rotary body 11 and the spaces which allow an elastic deformation of the elastic body 10 are provided by a simple means, the shock during the rotation is buffered with efficiency.

Although the input rotary body 6 in this embodiment is formed of a rigid resin, it goes without saying that the material is not restricted thereto and a metal material is also usable. Similarly, the metal plate as a material of the output rotary body 11 in this embodiment may be replaced by another material.

In addition, the number of engaging spaces 9A of the input rotary body 6, the number of projecting portions 10B of the elastic body 10 and the number of protruding pieces 11A of the output rotary body 11 are not restricted to three as in this embodiment, and may be freely selected in accordance with the load.

The following table shows the result of the experiment on the influence of a coating treatment of the surface of the elastic body 10 on the wear resistance.

| Material of elastic body 10 | Coating treatment | Wear |
| --- | --- | --- |
| NBR butadiene-acrylonitrile rubber | x | Small |
|  | o | None |
| SBR styrene-butadiene rubber | x | Medium |
|  | o | Small |

As explained in detail above, according to the rotation transmission buffer apparatus of the present invention, since the projecting portions 10B of the elastic body 10 are fitted into the respective engaging spaces 9A of the input rotary body 6 and the protruding pieces 11A of the output rotary body 11 are fitted into the respective engaging grooves 10D of the elastic body 10, the structure is simplified, which leads to a reduction in the number of assembling steps and, hence, in the manufacturing cost.

In addition, since the surface of the elastic body 10 is subjected to a wear resistance enforcing treatment, even if the elastic body 10 comes into contact with the side surface of the input rotary body 6 or the side surface of the output rotary body 11, it is unlikely that a crack is formed on the elastic body 10 or the elastic body 10 is damaged.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A rotation transmission buffer apparatus comprising:

an input rotary body having an outer peripheral member, an inner peripheral member, a plurality of joint arms extending between the inner and outer peripheral members, and a plurality of engaging spaces between said joint arms and said inner and outer peripheral members;

an elastomeric body provided with a plurality of projecting portions which are fitted into said plurality of engaging spaces of said input rotary body, each of said projecting portions having a T-shaped engaging groove formed therein, said elastomeric body having been subjected to a wear resistant reinforcing treatment selected from the group consisting of halogenation and resin coating;

and an output rotary body provided with a plurality of protruding pieces which are respectively fitted into said plurality of engaging grooves of said elastomeric body;

whereby the turning forces of said input rotary body is transmitted to said output rotary body through said elastomeric body.

2. A rotation transmission buffer apparatus comprising:

an input rotary body having an outer peripheral member, an inner peripheral member, a plurality of joint arms extending between the inner and outer peripheral members, and a plurality of engaging spaces between said joint arms and said inner and outer peripheral members;

an elastomeric body provided with a plurality of projecting portions which are fitted into said plurality of engaging spaces of said input rotary body, each of said projecting portions having a T-shaped engaging groove formed therein, said elastomeric body having been subjected to a wear resistant reinforcing treatment selected from the group consisting of halogenation and resin coating;

and an output rotary body provided with a plurality of protruding pieces which are respectively fitted into said plurality of engaging grooves of said elastomeric body, said elastomeric body having side faces one of which faces said input rotary body and another of which faces said output rotary body, said elastomeric body having a plurality of small projections provided on both side faces thereof so as to facilitate elastic deformation of said elastomeric body;

whereby the turning forces of said input rotary body is transmitted to said output rotary body through said elastomeric body.

* * * * *